United States Patent [19]
Persson

[11] 3,899,022
[45] Aug. 12, 1975

[54] METHOD AND PLANT FOR REGULATING TEMPERATURE BY MEANS OF A SUBTEMPERED AIR FLOW

[75] Inventor: Sixten Ismael Persson, Stockholm, Sweden

[73] Assignee: Luftkonditionering AB, Stockholm, Sweden

[22] Filed: May 7, 1973

[21] Appl. No.: 357,741

[30] Foreign Application Priority Data
May 9, 1972 Sweden.............................. 6092/72
Jan. 26, 1973 Sweden............................. 7301146

[52] U.S. Cl.................................... 165/22; 165/39
[51] Int. Cl............................................. F24f 3/00
[58] Field of Search................ 165/22, 50, 39, 40, 2

[56] References Cited
UNITED STATES PATENTS
2,072,166  3/1937  Goodman........................... 165/22
2,188,775  1/1940  Locke................................. 165/22

Primary Examiner—Charles Sukalo
Attorney, Agent, or Firm—Fred Philpitt

[57] ABSTRACT

A thermostat actuated regulating device for a subtempered air flow is made to be set automatically in one of two positions so as to let through to a room either a maximum or a minimum flow. When the heat emission is less than maximum but greater than minimum such a cyclical setting of the maximum and the minimum flow, respectively, is accomplished, that the total amount of air supplied during a period of time corresponds to actual cooling requirements. The let through maximum of minimum flow is supplied by an arbitrarily elaborated and/or placeable supply air device which cooperates or is provided with the regulating device for instance a damper. A separate heating unit belonging to the system is switched off at maximum flow and at minimum flow is switched on or off depending on the actual heat emission in the room.

2 Claims, 10 Drawing Figures

METHOD AND PLANT FOR REGULATING TEMPERATURE BY MEANS OF A SUBTEMPERED AIR FLOW

This invention relates to a method of, by means of a regulating device actuatable by at least one thermostat, for instance a damper, regulating the temperature in a room utilizing a variable air flow, subtempered in relation to the temperature of the room, which is blown into the room via at least one supply air device connected to a supply air duct.

In a previously known method of this kind the regulating device has permitted continuous variation of the subtempered air flow supplied to the room, which has complicated the construction of both regulating device and supply air device, involved high costs for these elements and limited the possibilities of adaptation to the various wants and needs prevailing in different types of premises and with different heat load conditions.

An object of the present invention is to provide an improved method of the described kind, wherein the aforesaid disadvantages are eliminated.

An essential feature of the method according to the invention is that the thermostat-actuated regulating device is made to be set automatically in one of two positions in order to let through either a maximum flow intended to compensate for the maximum heat emission in the room or a minimum flow corresponding to the minimum air change in the room dictated by hygienic considerations, whereby, when the heat emission in the room is less than maximum but greater than minimum such a cyclical setting of the maximum and minimum flow is accomplished that the total amount of air supplied during a period of time corresponds to actual cooling requirements.

The simple two-way regulation of the regulating device, for instance the damper, simplifies its construction, reduces the costs and gives improved operational reliability upon application of the method. At the same time freedom of choice with regard to type and placing of the supply air device is permitted which offers considerable flexibility in application of the method, which is an extremely important advantage that had no counterpart in previously applied methods for temperature regulation. The regulating device can thus be combined in different ways with different types of supply air device, for example be built together with a supply air device placeable in the ceiling of the room or under a window, or with a combined supply and exhaust device. Alternatively, the regulating device itself can be arranged in the supply air duct at a considerable distance from the supply air device, which can be of a simple or more intricate kind depending on the particular needs prevailing in different actual cases. A further major advantage is that the regulating device can simultaneously regulate the flow to several supply air ducts arranged in the form of a branch duct system.

In practice it is preferred that the regulating device be actuated by a thermostat which is located in the room or in an exhaust air duct leading from the room.

In those cases when at least one separate heating unit is utilized to heat the room it is preferred that the thermostat apart from the regulating device also regulates either directly or indirectly the separate heating unit so that this is switched off during maximum flow. During minimum flow the heating unit is switched on when this is necessary in order to compensate for heat losses.

Then the advantage is obtained that the air treatment unit and the separate heating unit work alternatively with each orther, so that costs need not unnecessarily be expended either on cooling of air which is subsequently to be heated after having been admitted to the room or on such extra heating of a room as is required if a subtempered air flow is at the same time admitted to the room. Both the separate heating unit and a central treatment unit provided for air conditioning with appurtenant ducting and cooling machinery can be given small dimensions. The principal task of the separate heating unit is thus merely to ensure that the temperature of the room will not fall below a predetermined minimum value, which in practice implies that the separate heating unit is engaged as a rule only when other heat-generating apparatus in the room is shut off and/or when a smaller number of persons than the room is intended for are present in the room and/or in very cold weather, when the need of transmission heat for the room is great. Only upon maximum loading of the room, furthermore, is it necessary for a maximum air flow to be continuously supplied thereto. Since, as a rule, activities vary within different nearby premises connected to the same central air treatment unit, so that "varying load" occurs in respect of the ventilation requirement of the different premises, it will be understood that the central treatment unit as well as appurtenant refrigerating machinery and ducting can, by utilizing the method according to the invention, be given substantially smaller dimensions than in a corresponding conventional plant.

In certain cases the heat emission of the heating unit can then be controlled by the outdoor temperature via another thermostat.

The heating unit can be located, apart from in the room, alternatively or additionally in the supply air duct.

The invention relates also to a plant for application of the method heretofore described, the essential features thereof being described in the appended claims.

Further aspects of the invention will become apparent from the following description of some applications thereof, wherein reference is made to the accompanying drawings.

FIG. 1 illustrates temperature regulation by application of the method according to the invention in two different sized, windowless conference rooms.

FIG. 2. shows a section of the conference rooms according to FIG. 1.

Figure 1:
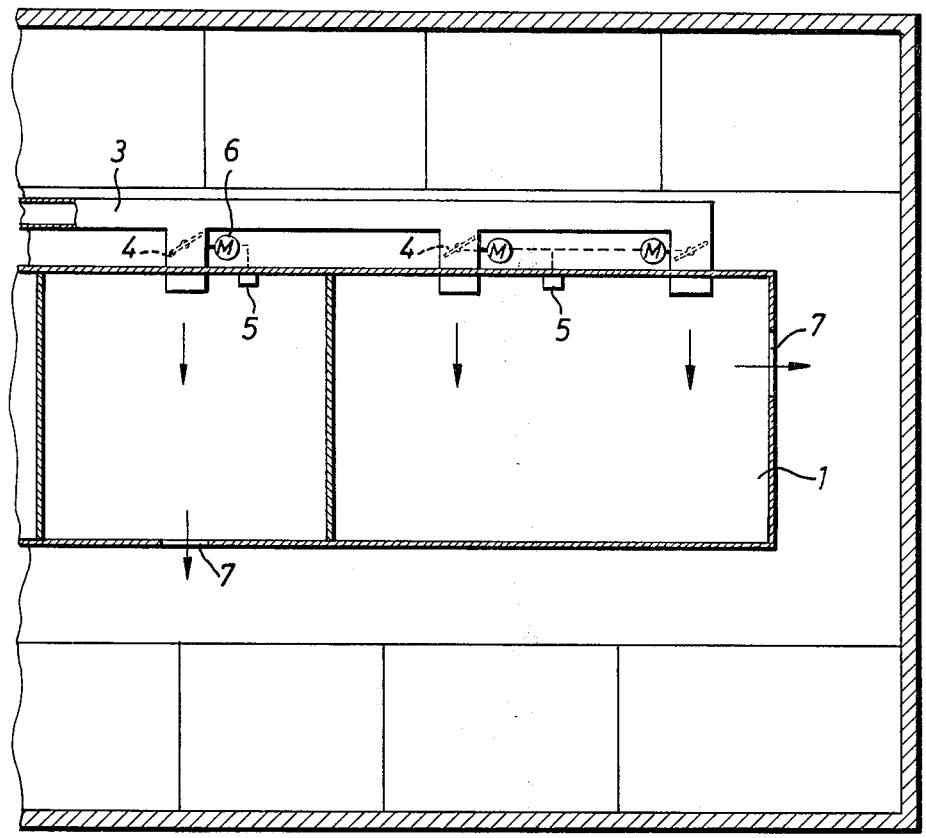
Figure 2:
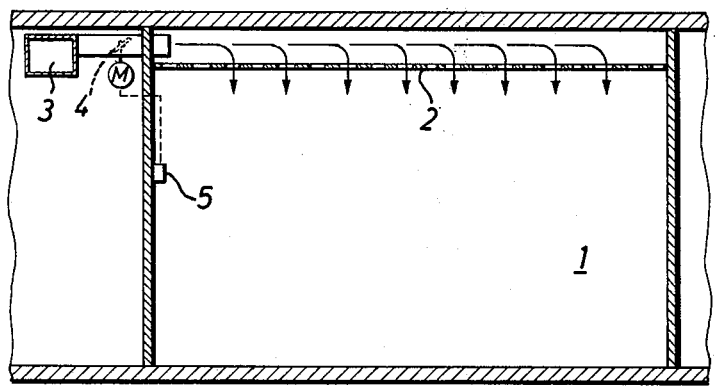

In FIGS. 1 and 2 temperature regulation by means of a variable air flow in a dark conference room 1 is illustrated. A dark conference room is understood to imply a room without windows. The air is supplied to the room via a perforated sub-ceiling 2, which thus serves as supply air device for an airflow which is subtempered in relation to the temperature of the room. For this purpose, arranged in a supply air duct 3 is a regulating device in the form of a damper 4, which actuated by a thermostat 5 via a motor 6 is automatically set in one of two positions. In one position a maximum flow is let through of a magnitude which affords compensation for the maximum heat emission in the room, which occurs when the room is full of people. In the other position, a minimum flow is let through, which corresponds to the minimum air change in the room dictated by hygienic considerations. The ratio between the different flows can in practice amount to 10:1. If the minimum flow amounts to 10 percent of the maximum flow, temperature regulation is thus achieved in such a way that when the room temperature exceeds the value set on the thermostat 5 the damper opens, whereupon the air flow increases from 10 to 100 percent.

Conversely, the flow is regulated down from 100 to approx. 10% when the temperature of the room falls below the room temperature set on the thermostat.

At minimum flow a certain amount of airing of the conference room when it is unoccupied by persons will be obtained The supplied air flow departs via surplus air outlets 7 to surrounding corridors.

Light fittings for the conference room are not shown in FIGS. 1 and 2.

Figure 3:
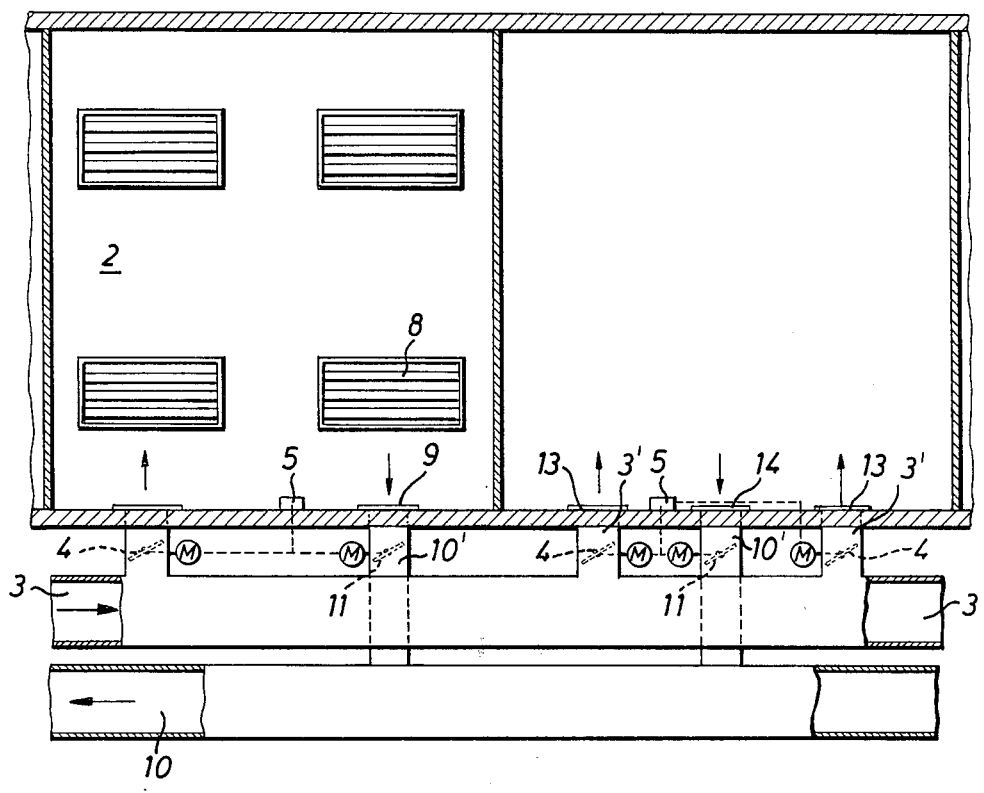
FIG. 3 illustrates a method of temperatur regulation in department stores and shop premises.
Figure 4:
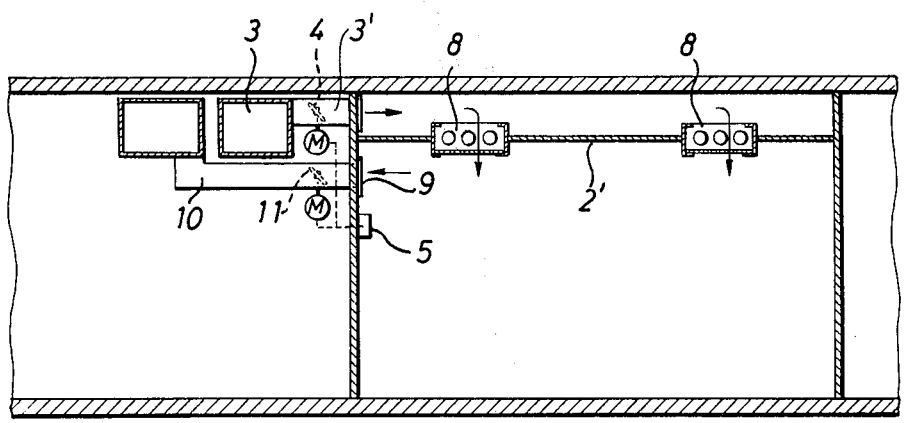
FIG. 4 is a section through the room shown to the left in FIG. 3.
Figure 5:
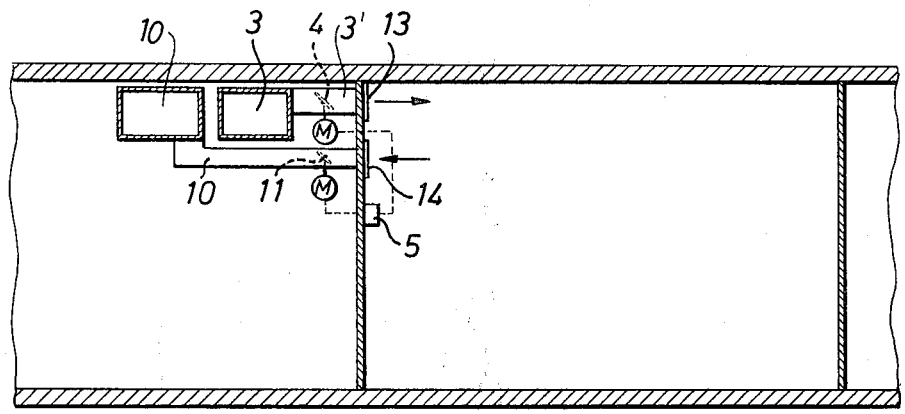
FIG. 5 is a section through the room shown to the right in FIG. 3.

In FIGS. 3–5, room temperature regulation in departmental stores and shop premises with the aid of a variable, subtempered air flow is illustrated. The regulating principle corresponds to that described heretofore with reference to FIGS. 1 and 2. In the left part of FIG. 3, the air is supplied via light fittings 8, which is also illustrated in FIG. 4.

The light fittings can consist of fluorescent tube fittings so elaborated as to allow air to pass trough them. The fittings are placed in a "tight" sub-ceiling 2'.

The exhaust air departs via a wall-mounted grille 9, at the connection duct 10' of which a variable flow device is located. The damper 11 of this device is controlled synchronously with the damper 4 for supply air.

In the righthand part of FIG. 3 — also illustrated in FIG. 5 — the air is admitted via two wall-mounted grilles 13. The exhaust air departs via a similarly wall-mounted grille 14. Mounted in the connection duct 3' of the supply air grille and 10' of the exhaust air grille are dampers 4 och 11 respectively. These are controlled synchronously with the aid of room thermostat 5.

Figure 6:
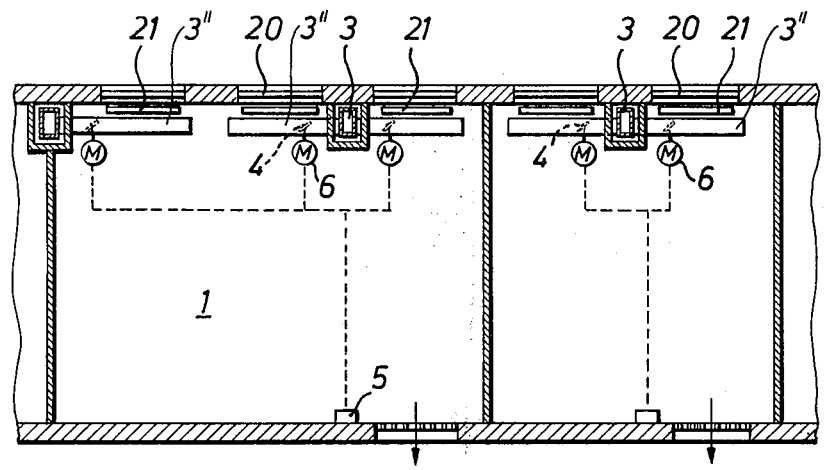
FIG. 6 illustrates temperature regulation in a room which in cold weather requires heat, for instance a windowed office room.
Figure 7:
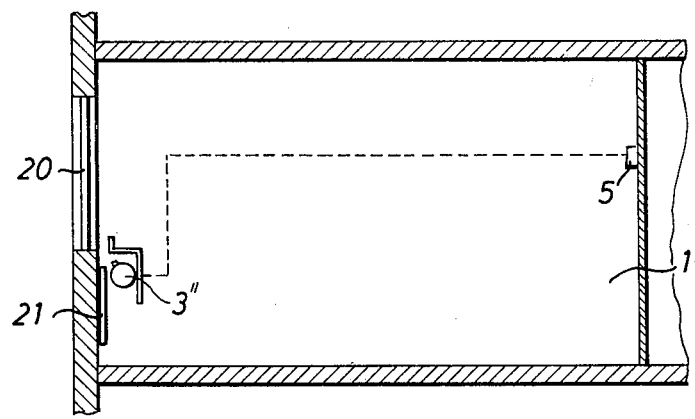
FIG. 7 shows a section of FIG. 6.

In FIGS. 6 and 7, temperature regulation in windowed rooms which in cold weather requires heat, for example windowed office rooms, is illustrated. A variable air flow is supplied to the room 1 under window 20. Under the window there is also a heater 21, the main function of which is to provide the heat needed by the room in cold weather. The air is supplied via a duct 3".

The room can be calculated to have a relatively large transmission heat reguirment and the output of the heater at the lowest outdoor temperature is dimensioned to compensate for both heat transmission and the cooling output supplied to the room at the subtempered basic or minimum flow. With regard to output regulation of the heater some different regulating cases can be distinguished:

1. The heater has a "fixed" heat output.

In this case the heat emission is not regulated in dependence of the outdor temperature. For this case electric heaters are used in the first instance.

2. The heater output is regulated in dependence of the outdoor temperature.

At a room temperature of +20°C and an outdoor temperature of −20°C the heat transmission in the room can for example be assumed to amount to 500 kcal/h, whereas at an outdoor temperature of ±0°C it can be assumed to amount to 250 kcal/h. This form of regulation is very common with water-heated heaters and is achieved by lowering of the input line temperature to the radiator when the outdoor temperature rises.

The same form of regulation is in principle possible also for electric heaters. Characteristic of this type of regulation is that the transmission heat requirement of the room is adapted according to the outdoor temperature. In order to obtain the right room temperature in this case solar heat, person heat, lighting heat, etc., must be "cooled" away to the necessary extent. When applying the method according to the invention, this can be achieved in either of the following ways:

a. Regulation in three stages. From maximum heat requirement to maximum cooling requirement in the room regulation is then achieved in the following manner:

Stage 1: The heater is switched on, basic or minimum flow is supplied to the room.

Stage 2: Only basic or minimum flow is supplied.

Stage 3: Only maximum or boosting flow is supplied.

Since the heater cannot be switched on at maximum flow good operating economy is ensured.

b. Regulation in two stages. The room temperature is then regulated in the following two stages:

Stage 1: The heater is switched on, in addition to which basic or minimum flow is supplied to the room.

Stage 2: Only maximum or boosting flow is supplied.

Good operating economy is obtained also with this type of regulation. Nevertheless, it is recommended that the heat emission of the heater be controlled in dependence of the outdoor temperature.

In such rooms as largely lack a transmission heat requirement in cold weather, e.g., a room without cooled surfaces in the middle of a building, it is possible, depending on the ratio between minimum and maximum flow and the accuracy wanted in respect of temperature holding, to distinguish the following typpe cases:

1. The minimum or basic flow comprises a small portion of the maximum or booster flow and/or the room temperature is permitted to deviate from a predetermined value.

This case can examplewise relate to a "dark" conference room of the kind shown in FIGS. 1 and 2. The minimum or basic flow is then small. Via the subtempered minimum flow a small cooling output is supplied to the room, which tends to slightly lower the room temperature. This lowering from examplewise 20° to 18°C can be accepted without further ado and consequently the room temperature regulation is limited to regulation of the air flow.

2. The minimum or basic flow comprises a relatively larger share of the maximum or boosting flow and/or the room temperature is not permitted to deviate from a predetermined value.

Since in this case a larger cooling output is supplied at the minimum or basic flow, an unacceptable lowering of the room temperature will be obtained. This lowering can be prevented by installation of a heater, which thus compensates for the supplied cooling output. The heater is appropriately installed in the supply air duct to the room concerned. The heater can appropriately be made for a fixed heat output (compare the above). The room temperature regulation can be carried out in two or three stages (compare the above).

Figure 8:
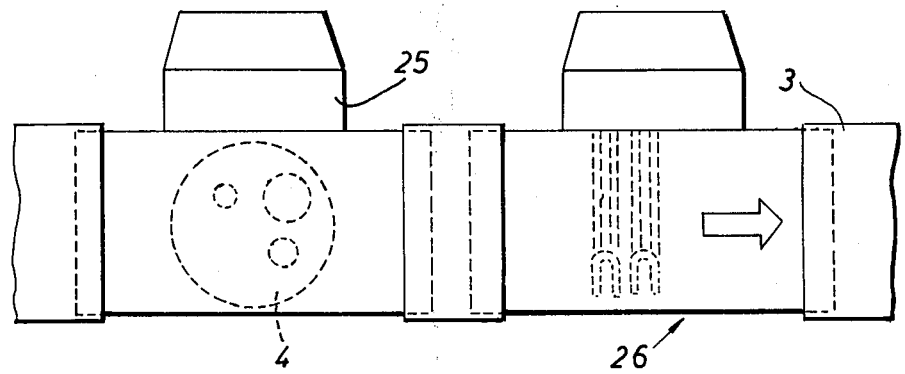
FIG. 8 shows a regulating device for variable air flow in combination with electric heaters located in a supply air duct.

In FIG. 8, a regulating device in the form of a damper 4 for a variable air flow in combination with electric heaters 26 is shown on a bigger scale.

The damper 4 is maneuvered between its two setting positions by a thermostat-actuated motor 25. The electric heater 26 is like the damper 4 located in the supply air duct 3. The electric heater 3 is appropriately controlled by a second thermostat (not shown), switching on of the electric heater thus being allowed only when the damper 4 is in the setting position corresponding to the minimum value for the air flow.

Figure 9:
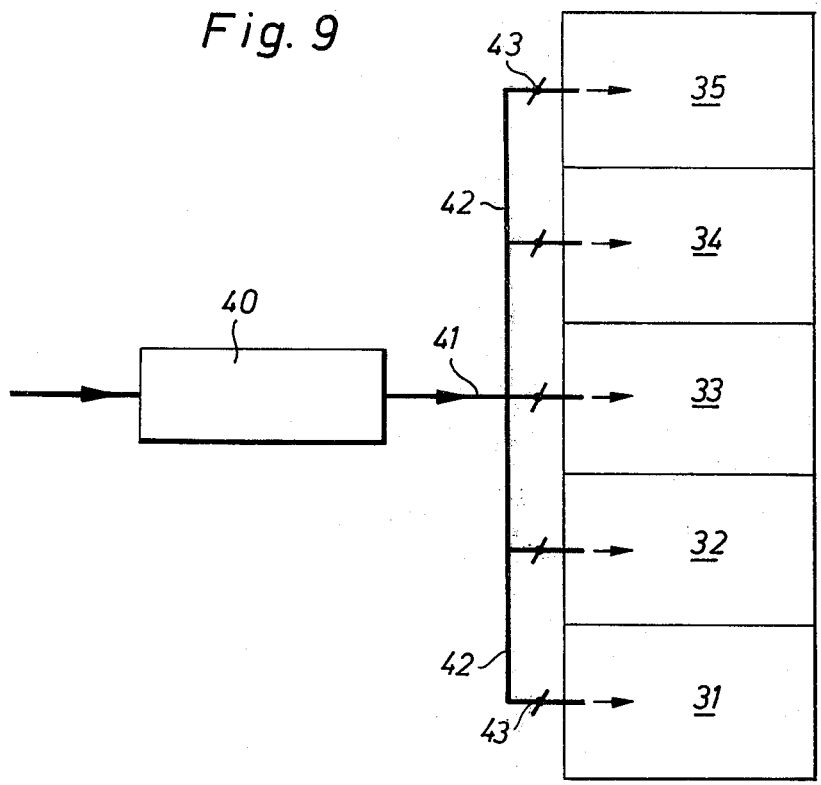
FIG. 9 illustrates a modification in which, an air treatment unit via a supply duct system, supplies treated air to a number of adjoining rooms.

In FIG. 9, reference numerals 31–35 designate a number of rooms in a building, each of which displays large variations in respect of the ventilation requirement in consequence of the circumstance that different numbers of persons stay in them, that the light fittings are switched off an on varyingly, that heating in consequence of solar radiation through the windows varies, etc. By means of a central air treatment unit 40, which comprises fan, filter, heater, cooler, humidifier (not shown), subtempered air is supplied to the different rooms via a duct system 41,42.

Figure 10:
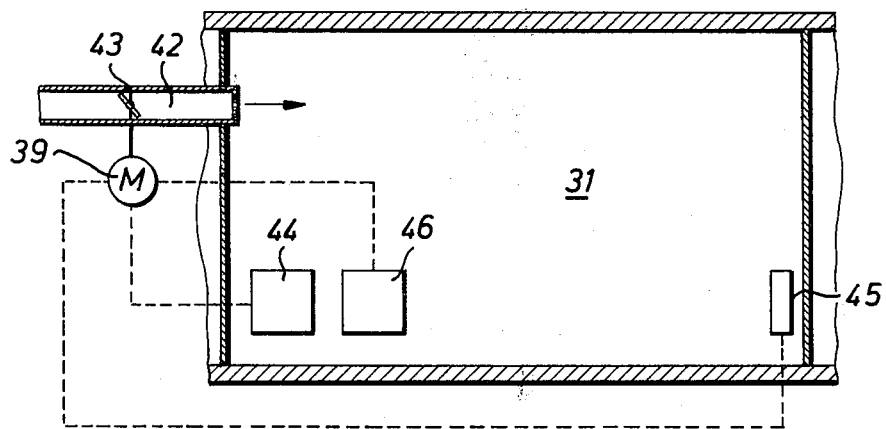
FIG. 10 shows on a larger scale one of the rooms according to FIG. 9 and the equipment contained therein.

The room 31 shown on a larger scale in FIG. 10 can be assumed to consist for instance of a conference room, in which the load on the air treatment unit varies between the following four principal conditions:

1. The room unused, lights off.
2. The room unused, lights on.
3. 60 percent person coverage, lights on.
4. 100 percent person coverage, lights on.

In the supply duct 42 to the room 31 there is a regulating device 43 whhch consists of a damper provided with passage openings, which damper can be set by a drive motor 39 between a closed position, in which a minimum flow is admitted to the room through the passage openings, and a wide open position, in which a maximum air flow is admitted to the room. The motor 39 is controlled by a first room thermostat 44, which senses the temperature in the room.

In the room there is also a separate heating unit, for instance an electric heater 45 located by a window, which heater is controlled by a second thermostat 46. The arrangement is such that the thermostat 46 is unable to perform its regulating function and switch on the electric heater 45 until the regulating device 43 has adopted the closed position. This can be achieved, for example, by means of a suitably located limit switch (not shown).

The plant will function in the following manner in the four above-mentioned different load circumstances:

1. Unused room, lights off. Only a minimum flow is now admitted to the room. The size and cooling capacity of that flow is so selected that with allowance for storage effects in joisting etc. the room temperature will as a rule not be lowered appreciably below a normal condition. If a lowering of the temperature occurs, for instance in consequence of an increased transmission heat requirement during cold weather, the temperature drop is sensed by the thermostat 46 which switches on the electric heater 45. The electric heater is switched off again as soon as the prescribed minimum temperature is reached.

2. Unused room, lights on. In this case the minimum flow is insufficient to carry away the heat contribution from the lighting while at the same time the maximum flow gives too large a cooling contribution. Consequently, the plant will switch between maximum and minimum flow.

3. 60 percent person coverage, lights on. The maximum flow will in this case prevail for the greater part of the time in order to carry off the heat contribution from persons and lighting in the room.

4. 100 percent person coverage, lights on. The maximum air flow will be admitted all the time, since this condition constitutes the dimensioning point for maximum requisite cooling capacity.

In consequence of it being assumable that the loads on the different rooms 31–34 will vary, the central treatment unit 40 and the main line 41 can be given smaller dimensions, perhaps 50–60 percent of what corresponds to the total maximum requirement.

In all the above described application examples, very good operating economy is obtained in consequence of correct flow at varying load. No regulating energy needs to be supplied. Fast automatic regulation of the room temperature is provided, and in addition simple division into zones can be arranged.

The various examples are intended to demonstrate that the method according to the invention can be applied in different types of premises, where varying loads occur. The adaptability to different supply air devices then assures great flexibility for the different application cases.

Further modifications are possible within the framework of the invention as defined in the accompanying claims.

What I claim is:

1. In the known combination of a system for regulating the temperature in a room that has at least one inlet duct for the introduction of tempered air, a damper in at least one inlet duct, said damper being designed to regulate the quantity of tempered air introduced into said room, the improvement which comprises:
   a. each damper being mounted in the air duct with which it is associated so that the damper can only be disposed in two positions, said two positions consisting of a maximum air flow position and a minimum air flow position,
   b. motor means operatively associated with each damper for moving said damper back and forth between said maximum air flow position and said minimum air flow position, and
   c. temperature sensing means operatively connected to said motor means in such a way that a predetermined change in temperature of the air at a point downstream of the point where the air inlet duct enters the room will cause said motor means to move said damper to the other of its only two positions, and thus changing the flow rate of tempered air into the room.

2. In the known combination of a system for regulating the temperature in a room that has at least one inlet duct for the introduction of tempered air, a damper in at least one inlet duct, said damper being designed to regulate the quantity of tempered air introduced into said room, the improvement which comprises:
   a. each damper being mounted in the air duct with which it is associated so that the damper can only be disposed in two positions, said two positions consisting of a maximum air flow position and a minimum air flow position,
   b. motor means operatively associated with each damper for moving said damper back and forth between said maximum air flow position and said minimum air flow position,
   c. temperature sensing means operatively connected to said motor means in such a way that a predetermined change in temperature of the air at a point downstream of the point where the air inlet duct enters the room will cause said motor means to move said damper to the other of its only two positions, and thus changing the flow rate of tempered air into the room, and
   d. at least one heating unit which is operatively connected to said thermostat in such a way that the heating unit is energized when said damper is in its minimum flow position and deenergized when said damper is in its maximum flow position.

* * * * *